United States Patent [19]

Koyama

[11] Patent Number: 5,068,767
[45] Date of Patent: Nov. 26, 1991

[54] AUTOMATIC FOCUS POSITION ADJUSTING UNIT FOR USE IN SHADOWLESS LIGHTING DEVICE

[75] Inventor: Mitsuhiro Koyama, Tokyo, Japan

[73] Assignee: Yamada Iryo Shomei Kabushiki Kaisha, Tokyo, Japan

[21] Appl. No.: 640,626

[22] Filed: Dec. 21, 1990

[30] Foreign Application Priority Data

Oct. 1, 1990 [JP] Japan ............................. 2-102236[U]

[51] Int. Cl.$^5$ ............................................. A61G 13/00
[52] U.S. Cl. .................................. 362/33; 315/152; 362/286; 362/804
[58] Field of Search ............... 362/33, 233, 239, 250, 362/271, 286, 372, 383, 386, 428, 804; 315/152

[56] References Cited

U.S. PATENT DOCUMENTS

| | | | |
|---|---|---|---|
| 4,578,575 | 3/1986 | Roos | 362/804 X |
| 4,639,838 | 1/1987 | Kato et al. | 362/804 X |
| 4,884,008 | 11/1989 | Bossler et al. | 362/804 X |

*Primary Examiner*—Stephen F. Husar
*Attorney, Agent, or Firm*—Wenderoth, Lind & Ponack

[57] ABSTRACT

An automatic focus position adjusting unit for use in a shadowless lighting device for medical purposes includes a sensor, a start switch, a start processor, and a direction adjuster. The unit also includes a focus mover, a peak detector, and an adjustment completion unit. The shadowless lighting device for medical purposes has a housing, illuminating bulbs arranged in the housing, and a drive system for inclining the illuminating bulbs so that the optical axes of the illuminating bulbs may converge, and form a focus, on a predetermined position along a focus moving axis. The automatic focus position adjusting unit permits, with a simple operation, an accurate focus position adjustment at a desired position. This is because it is possible to move the focus to a position at which the amount of light, reflected from the predetermined region at the center of the range of light, becomes a maximum.

1 Claim, 6 Drawing Sheets

AUTOMATIC FOCUS POSITION ADJUSTING UNIT FOR USE IN SHADOWLESS LIGHTING DEVICE

BACKGROUND OF THE INVENTION

1. Field of the Invention

The present invention relates to an automatic focus position adjusting unit, and more particularly to an automatic focus position adjusting unit for use in a shadowless lighting device for medical purposes.

2. Description of the Related Art

A shadowless lighting device for medical purposes is utilized for illuminating a human body to be operated upon during an operation. This type of lighting device is capable of so illuminating a part to be operated upon that no shadows are formed. The lighting device is required to have an ability to adjust the focus position according to the desire of a surgeon. To adjust the focus position in such a way, an automatic focus position adjusting unit using supersonic waves has been known. This type of unit emits supersonic waves from the direction of illuminating lamps to the body to be operated upon, and detects the waves reflected from the body so as to measure the propagation distance based on the propagation time. The focus position is automatically adjusted based on the measured distance. An automatic focus position adjusting unit, using a transmitter which can be manipulated while being held in the surgeon's hand, is also known. In such a unit, the surgeon introduces the transmitter to a position at which he wants the focus position to be formed, and actuates the transmitter to send the signal. The signal transmitted from the transmitter is detected in the direction of the illuminating lamps, whereby the focus position is automatically adjusted so that it may move to the position where the transmitter has been introduced.

In the automatic focus position adjusting unit using supersonic waves, however, there is a problem in that when the illuminating lamps are positioned at an oblique angle with respect to the body to be operated upon, it is impossible to measure the distance correctly. That is, the part of the body which the surgeon wants the illuminating lamps to illuminate is the part of the body to be operated upon, so that the unit using supersonic waves does not permit an accurate measuring of the distance with respect to the part to be operated upon. Moreover, with the automatic focus position adjusting unit using the transmitter, a problem concerning the difficulty of handling the unit exists. In other words, the surgeon must introduce the transmitter into the vicinity of a part to be operated upon. During operations, such as a laparotomy, the part to be operated upon is located deep inside the body, and it is very difficult to introduce the transmitter so deep. In addition, a hygiene problem, such as secondary infection, may occur.

SUMMARY OF THE INVENTION

An object of the present invention is therefore to provide an automatic focus position adjusting unit, for use in a shadowless lighting device for medical purposes, which permits, with a simple operation, an accurate focus position adjustment at a desired position.

The present invention provides an automatic focus position adjusting unit for use in a shadowless lighting device for medical purposes, the shadowless lighting device for medical purposes having a housing, a plurality of illuminating bulbs arranged in the housing, and a drive system for inclining the illuminating bulbs so that the optical axes of the illuminating bulbs may converge, and form a focus, on a predetermined position along a focus moving axis, the shadowless lighting device for medical purposes being constructed in such a manner that the focus is caused to move in a first direction along the focus moving axis by moving the drive system in the first direction, whereas the focus is caused to move in a second direction along the focus moving axis by moving the drive system in the second direction, the automatic focus position adjusting unit comprising: a sensor for outputting a value corresponding to the amount of light reflected from a predetermined region at the center of a range of the light, this range being formed on an object illuminated by the illuminating bulbs; a start switch for actuating a focus position adjustment; a start process means for retaining, when the start switch is actuated, a value which the sensor outputs, and for performing a start process in which the drive system is driven in the first direction; a direction adjusting means for comparing a value which the sensor outputs, after the start process means has performed the start process, with a value retained by the start process means, wherein the direction adjusting means determines that the first direction is a proper adjustment direction, when the outputted value after the start process means has performed the start process, is higher than the value retained by the start process means, and wherein the direction adjusting means determines that the second direction is the proper adjustment direction, when the outputted value after the start process means has performed the start process, is lower than the value retained by the start process means; a focus moving means for driving the drive system in the proper adjustment direction, after the direction adjusting means has made its determination; a peak detection means for monitoring a value which the sensor outputs while the focus moving means is driving the drive system, wherein when the value reaches a peak value, the peak detection means retains this peak value; and an adjustment completion means for driving the drive system in a direction opposite to the proper adjustment direction when the peak detection means detects the peak value, and when the value which the sensor outputs again reaches the peak value, the adjustment completion means stops the drive system, thereby completing a focus adjustment.

The sensor employed in the present invention outputs a value corresponding to the amount of light reflected from a predetermined region at the center of the range of light which is formed on an object to be illuminated. When the focus position is appropriately adjusted, the light illuminated by a plurality of illuminating bulbs is collected in substantially the same region. That is, the center of the range of the light becomes bright, and the amount of light reflected from this center increases. The present invention makes use of this principle so as to automatically adjust the focus position. In other words, the automatic focus position adjusting unit of the invention adjusts the focus position by virtue of the fact that the illuminating bulbs are inclined in such a direction that the value corresponding to the amount of light, which the sensor measures, is maximized.

When the start switch is depressed, the focus position at this moment is adjusted by moving it in either an upward direction or downward direction. The following method is employed to determine the correct direction in which to move the focus position. The start process means first moves the focus position in either of the above two directions, and then the direction adjusting means determines that one direction, for example, the upward direction, is the correct or proper direction, if the output value of the sensor increases. On the other hand, the direction adjusting means determines that the other direction, for example, the downward direction, is the correct direction, if the output value of the sensor decreases. After the correct direction has been recognized, the focus moving means moves the focus position in this correct direction. During the moving of the focus position, the peak detection means monitors the sensor output. Once the sensor output reaches its peak value, the direction in which the focus position has been moving is reversed. The adjustment completion means then causes the focus position to move back to a position at which the sensor output again reaches the peak value. Thus, the illuminating bulbs are directed to a position at which the sensor output reaches the peak value, whereby the focus position is automatically adjusted.

DESCRIPTION OF THE PREFERRED EMBODIMENT

Figure 1:
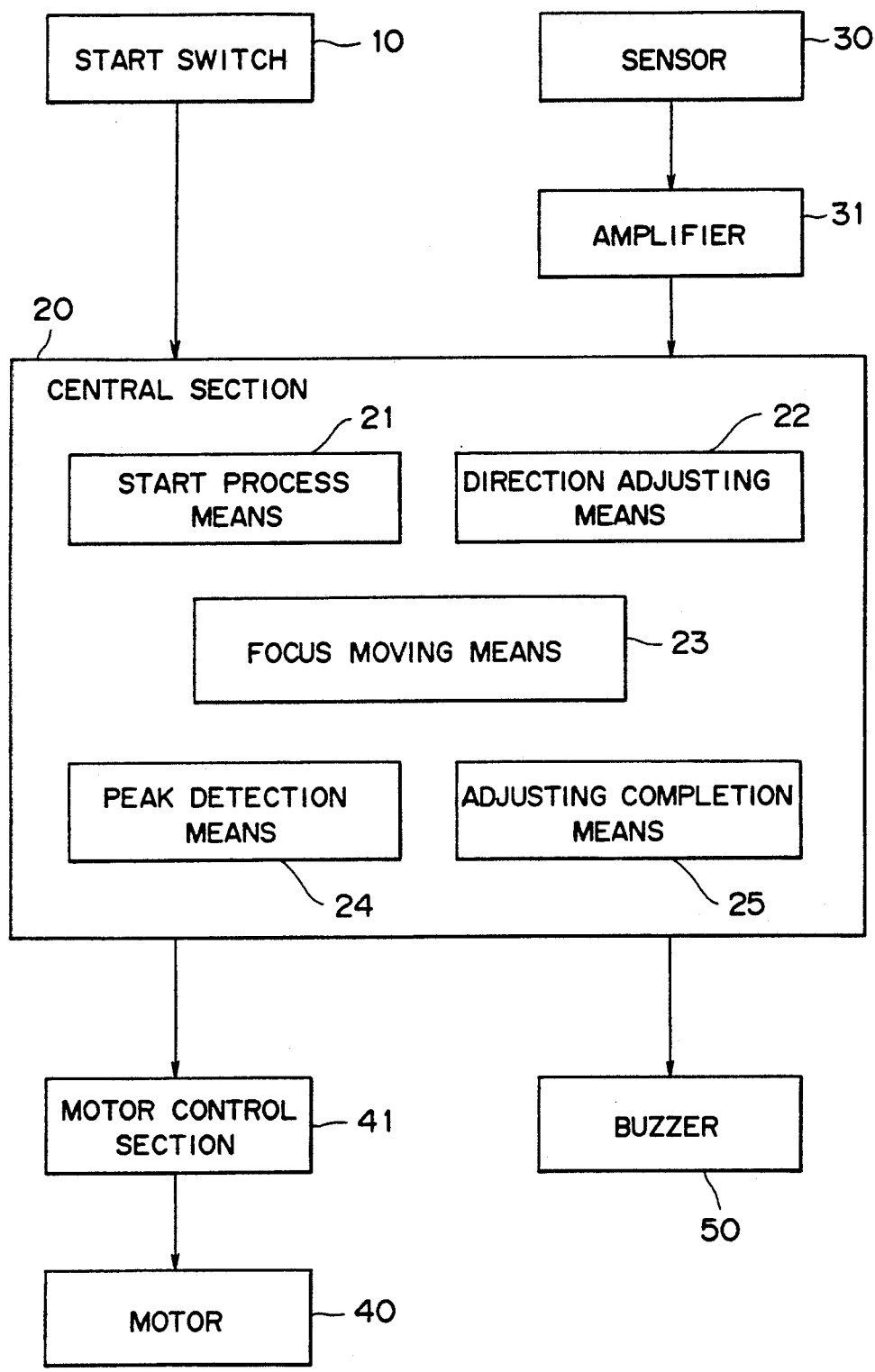
FIG. 1 is a block diagram showing the basic structure of an automatic focus position adjusting unit according to the present invention.

The present invention will be described hereinafter with reference an illustrated embodiment. FIG. 1 is a block diagram showing the basic structure of an automatic focus position adjusting unit according to one embodiment of the present invention. A start switch 10 is used for actuating a focus position adjusting function of the unit. When a surgeon depresses the start switch 10, the unit adjusts the focus position. Any type of switch may be used as the start switch 10, as long as it is capable of receiving the surgeon's instructions in the form of electrical signals. In this embodiment, a touch type electrostatic switch is utilized as the start switch 10 to improve the handling. Only the surgeon's soft touch on the electrostatic switch will provide instructions regarding the focus position adjustment. It is desirable to affix the electrostatic switch to a position adjusting handrail or an operation handle of a housing for illuminating lamps. It is common that the focus position of the unit must be adjusted, almost simultaneously after the surgeon grasps such a handrail or an operation handle to adjust the position of the illuminating lamps. If the electrostatic switch is therefore attached to the handrail or to the operation handle, the surgeon needs not take the trouble to adjust the focus position of the unit, after having adjusted to position of the illuminating lamps.

Instructions from the start switch 10 are sent to a central section 20. The central section 20 is composed of electrical circuits in which various logical elements are combined. It may also be composed of a microprocessor which operates based on predetermined programs. In this embodiment, the inside of the central section 20 is divided into five function blocks 21 through 25.

As will be detailed later, a sensor 30 is an optical sensor which outputs values corresponding to the amount of light reflected from a predetermined region over a position in which an operation is performed. The output from the sensor 30 is amplified by an amplifier 31 and is sent to the central section 20. When the central section 20 is composed of a microprocessor, the output from the sensor 30 is sent to the central section 20, after it has been converted into digital signals with an A/D converter (not shown).

The central section 20 controls both a motor 40 and a buzzer 50 based on the output from the sensor 30. In fact, the motor 40 is controlled via a motor control section 41. As will be described later, the motor 40 constitutes part of a drive system for inclining illuminating bulbs so that the optical axes of the illuminating bulbs converge on a predetermined position along a focus moving axis.

Figure 2:
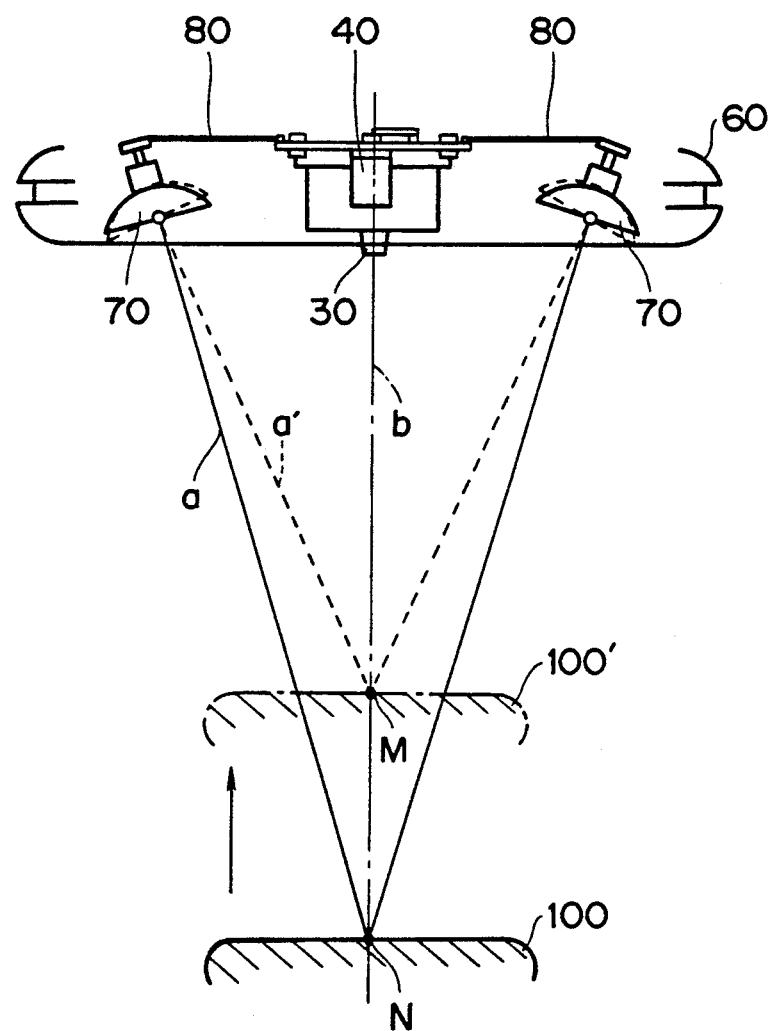
FIG. 2 is a view in which the unit illustrated in FIG. 1 is applied to a shadowless lighting device for medical purposes.

The structure of a shadowless lighting device for medical purposes to which the automatic focus position adjusting unit shown in FIG. 1 is applied will now be explained with reference to FIG. 2. A plurality of illuminating bulbs 70 are arranged in a housing 60 of the shadowless lighting device. To simplify the illustration, only two illuminating bulbs 70 are shown in this embodiment, although many illuminating bulbs may be provided in practice. The illuminating bulbs 70 are affixed to predetermined pivots so as to turn on the pivots with respect to the housing 60. Links 80, driven by the motor 40, are attached to the upper part of the illuminating bulbs 70. The actuation of the motor 40 permits the illuminating bulbs 70 to be inclined. On the assumption that the illuminating bulbs 70 are in the positions indicated by the solid lines in FIG. 2, all the optical axes "a" of the illuminating bulbs 70 converge on point N of a human body 100 to be operated upon, thereby forming a focus on the point N. Assuming that the body 100 to be operated upon is moved up to position 100', then, to form a focus on position M of the body 100 to be operated upon in the position 100', the motor 40 is driven to incline the illuminating bulbs 70 to the positions indicated by the dotted lines in FIG. 2. At this time, the optical axes of the illuminating bulbs 70 shift to axes "a'" indicated by the dotted lines, thereby converging on the position M. Thus, in this shadowless lighting device for medical purposes, the actuation of the motor 40 enables the focus position to move up and down along the focus moving axis "b" indicated by a one-dot chain line in FIG. 2.

The feature of the shadowless lighting device for medical purposes is that the sensor 30 is provided at the center of the lower part of the housing 60. As described earlier, the sensor 30 measures the amount of light reflected from the predetermined region at the center of a range of light formed on the body 100 to be operated upon. The function of the sensor 30 closely pertains to the basic principle of the present invention, and the basic principle will now be described with reference to FIGS. 3(a)-3(c) and 4(a)-4(c). As illustrated in FIG.

Figure 3:
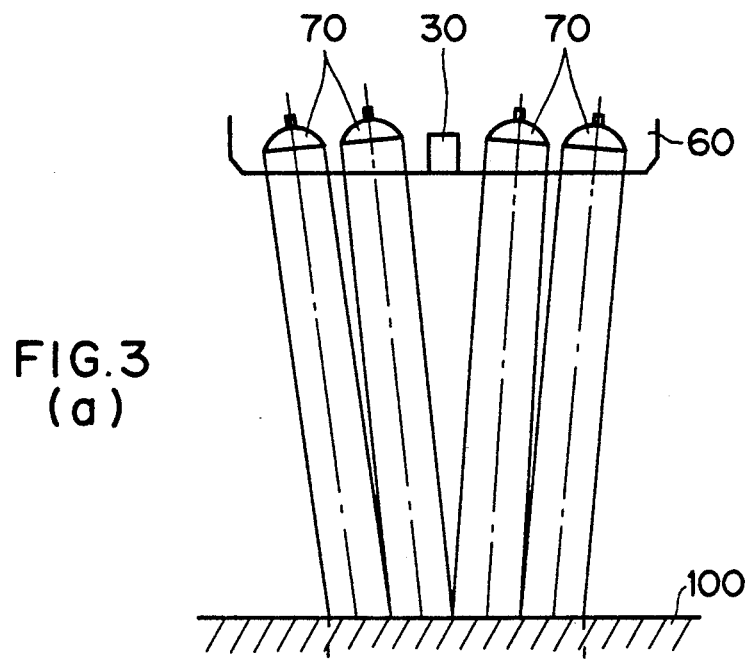
FIGS. 3(a)-3(c) are views in which the focus position is not adjusted by a unit of the present invention.
Figure 3:
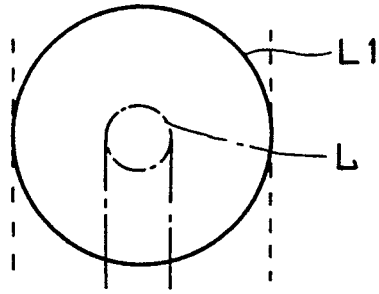
Figure 3:
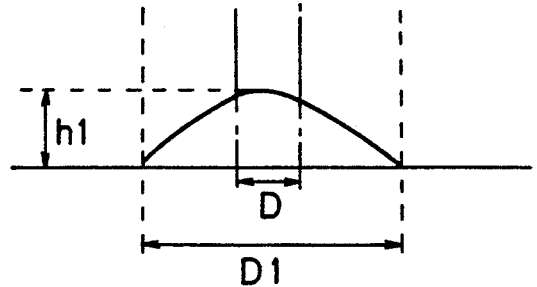
Figure 4:
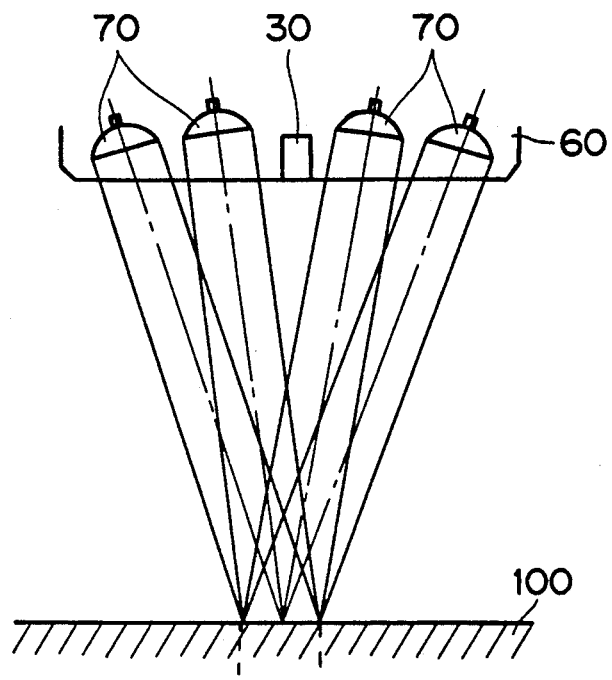
FIGS. 4(a)-(c) are views in which the focus position is adjusted by unit of the present invention.
Figure 4:
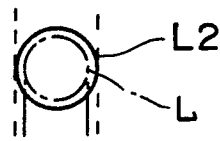
Figure 4:
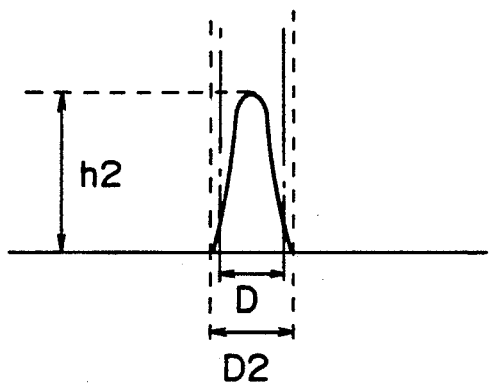

3(a), the illuminating bulbs 70 are kept in place inside the housing 60, whereby the surface of the body 100 to be operated upon is illuminated. The optical axes of the illuminating bulbs 70 lie in the directions indicated by the one-dot chain lines in FIG. 3(a), whereby a considerably wide part of the body 100 to be operated upon is illuminated. In the above state, the illuminating bulbs 70 are inclined so that the optical axes of the illuminating bulbs 70 may come to the center of the body 100 to be operated upon, as shown in FIG. 4(a). In FIG. 4(a), the optical axes of the illuminating bulbs 70 converge on a small region of the body 100 to be operated upon, thereby illuminating the small region. In other words, in FIG. 3(a) the focus position is located in a position below the surface of the body 100 to be operated upon, whereas in FIG. 4(a) the focus position is located substantially on the surface of the body 100 to be operated upon. The inclination of the illuminating bulbs 70 thus allows the focus position to move up and down along the focus moving axis "b". FIGS. 3(a)-3(c) show the state where the focus position is not adjusted, while FIGS. 4(a)-4(c) illustrate the state where the focus position is adjusted.

Attention is now given to a range of light covered by illumination on the surface of the body 100 to be operated upon. When the focus position is not adjusted, a considerably wide range of light L1 is obtained as illustrated in FIG. 3(b), while on the contrary, when the focus position is adjusted, a smaller range of light L2 is obtained as shown in FIG. 4(b). When the focus position is not adjusted, the quantity of light in the range of light L1 is distributed within a diameter D1, as shown in FIG. 3(c), whereby a peak value "h1" is obtained at the center of the diameter D1. On the other hand, when the focus position is adjusted, the quantity of light in the range of light L2 is distributed within a diameter D2, as shown in FIG. 4(c), whereby a peak value "h2" is obtained at the center of the diameter D2. On the assumption that a circle region "L", having a diameter "D", is defined as a region "L", and when the quantity of light in the region "L" of the range of light L1 is compared with the quantity of light in the region "L" of the range of light L2, then the distribution density of the quantity of light becomes higher when the focus position is adjusted as shown in FIG. 4(a) than the distribution density of the quantity of light when the focus position is not adjusted as shown in FIG. 3(a).

The basic principle of the present invention makes use of the above nature to adjust the focus. That is, as illustrated in FIG. 2, the sensor 30 is secured to the lower part of the housing 60. It measures the amount of light reflected from the predetermined region at the center of the range of light in order to output the measured values in the form of electrical signals, this range of light being formed on the body 100 to be operated upon by the illumination from the illuminating bulbs 70. More specifically, it is sufficient to construct the sensor 30 as follows: the sensor 30 is secured to the lower part of the housing 60 so that its optical 1 axis may coincide with the focus moving axis "b" indicated by a one-dot chain line in FIG. 2. The sensor 30 is thereby capable of receiving light reflected from the body 100 to be operated upon within a predetermined angle around the center of the focus moving axis "b". In the end, the basic principle of the automatic focus position adjusting unit is that as the illuminating bulbs 70 are inclined, the focus position is caused to move along the focus moving axis "b" so as to determine a position in which the sensor 30 outputs the maximum measured value. This position serves as the best focus position. The central section 20 controls the above basic operation.

Figure 5:
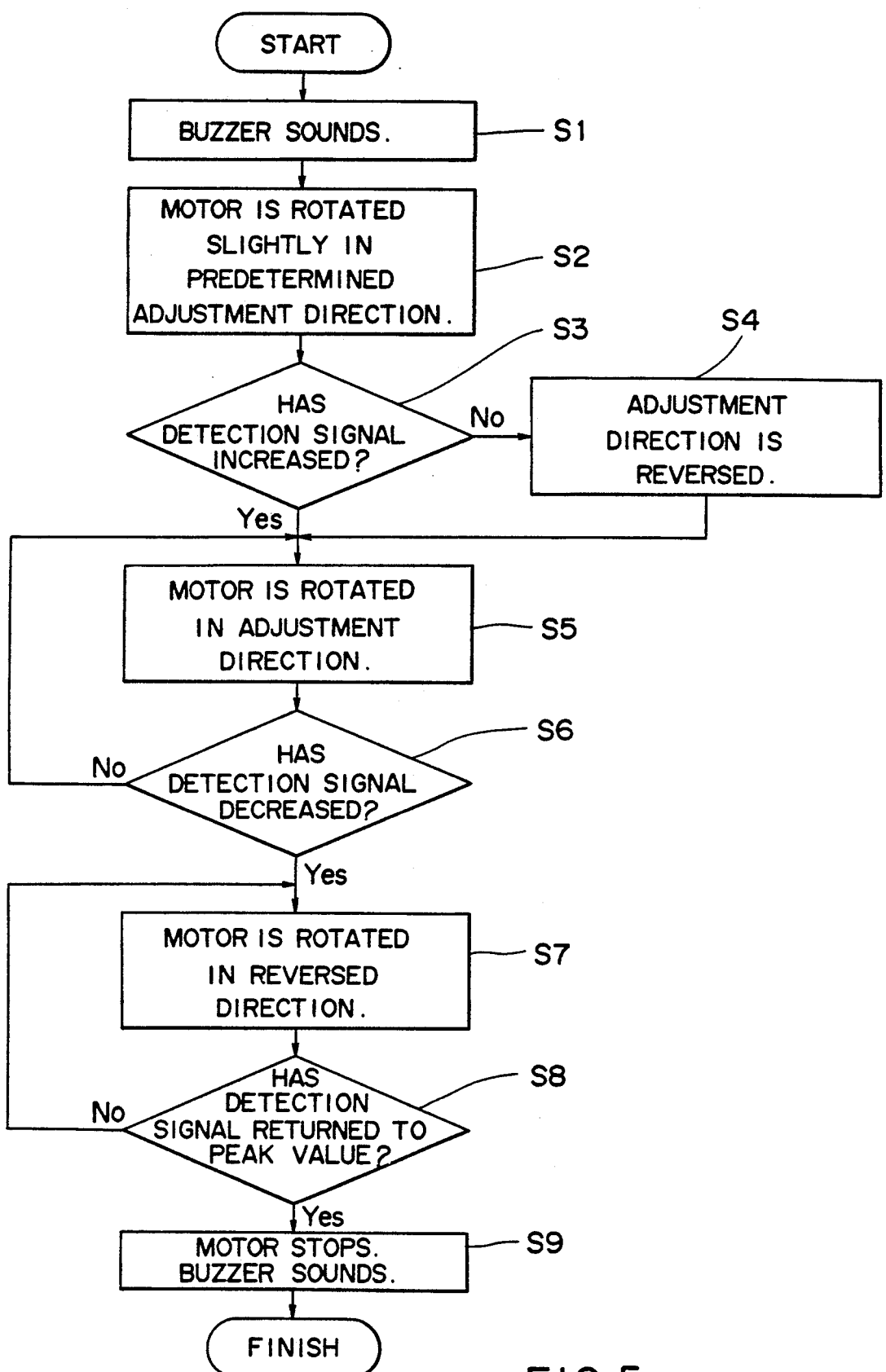
FIG. 5 is flowchart showing the operations of a central section of the unit illustrated in FIG. 1.

The control operation performed by the central section 20 will now be explained with reference to the flowchart of FIG. 5. Once a surgeon actuates the start switch 10, start instructions are sent to a start process means 21. When the start instructions are sent, the start process means 21 performs a buzzer sound process in step S1, thus causing the buzzer 50 to sound. This buzzer sound allows the surgeon to audibly confirm that the focus position adjustment has begun. The output value of the sensor 30 at the moment of the actuation of the start switch 10 is retained as an initial output value. In step S2, the start process means 21 rotates the motor 40 slightly in a predetermined adjustment direction. The motor 40 rotates in two directions: one is the direction in which the motor 40 causes the focus position to move upward along the focus moving axis "b"; the other is the direction in which the motor 40 causes the focus position to move downward along the axis "b". In step S2, the motor 40 rotates in either of the above direction.

After the above-described start process has been completed, a direction adjusting means 22 determines the correct adjustment direction. In other words, in step S3, it is determined whether or not a detection signal from the sensor 30 increases. If the detection signal increases in value, the direction in which the motor 40 had been rotated slightly in the start process is determined to be the correct adjustment direction. On the other hand, in step S3, if the detection signal does not increase, the control operation proceeds to step S4, in which the adjustment direction is reversed. In other words, a direction opposite to the direction in which the motor 40 had been rotated slightly in the start process is determined to be the correct adjustment direction. While the motor 40 is being driven in the correct focus adjustment direction, the output from the sensor 30 will increase according to the principle mentioned above. In step S3, if the detection signal increases in value, it is therefore determined that the motor 40 is being driven in the correct direction. On the other hand, in step S3, if the detection signal decreases, it is determined that the motor 40 is being driven in the direction opposite to the correct direction. In step S4, the rotary direction of the motor 40 is therefore reversed. As regards the determination in step S3, it is sufficient to employ a comparator or the like to compare the initial output value retained in the start process means 21 with output after the sensor 30 has been actuated.

After the correct adjustment direction has been recognized, as shown is step S5, a focus moving means 23 performs a focus moving process in which the motor 40 is rotated in the correct adjustment direction. In other words, the focus moving means 23 provides the motor control section 41 with instructions to keep rotating the motor 40 in the correct direction.

The focus position thus moves along the focus moving axis "b" toward an optimum position. As it moves, the output value of the sensor 30 increases.

Thus, while the focus position is moving in one direction, it passes the optimum position. After the focus position has passed the optimum position, the output value of the sensor 30 in turn starts to decrease. A peak detection means 24 is a detection means which detects whether or not the output value of the sensor 30 has reached a peak value. As indicated in step S6, the peak detection means 24 can determine whether the detection signal from the sensor 30 has reduced in value. More specifically, the peak detection means 24 has both an ability to retain the output value from the sensor 30 at fixed sampling intervals and an ability to compare a sample value at this moment with a previous sample value. When the sample value at this moment becomes smaller than the previous sample value, the peak detection means 24 retains that previous sample value as a peak value.

When the peak detection means 24 detects the peak value, in practice the focus position has already passed the optimum position, and the focus position must be caused to move back slightly. An adjustment completion means 25 makes the focus position move back. In step S7, it gives instructions causing the motor 40 to rotate in the reverse direction. As indicated in step S8, it is determined whether or not the detection signal from the sensor 30 has returned to the peak value. When the detection signal returns to the peak value, as indicated in step S9, the motor 40 stops and the buzzer 50 sounds. As described above, since the output peak value of the sensor 30 is retained by the peak detection means 24, it is possible to determine when the output value of the sensor 30 returns to the peak value while the peak value of the sensor 30 returns to the peak value while the peak value is continuously compared with the output values from the sensor 30.

The focus position thus moves to the optimum position, and then the automatic focus position adjustment is completed. The sound of the buzzer 50 enables the surgeon to recognize that the focus position adjustment has been completed.

Figure 6:
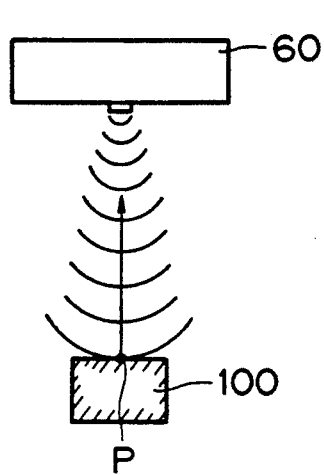
FIGS. 6 and 7 are views showing problems of the conventional automatic focus position adjusting unit using supersonic waves.
Figure 7:
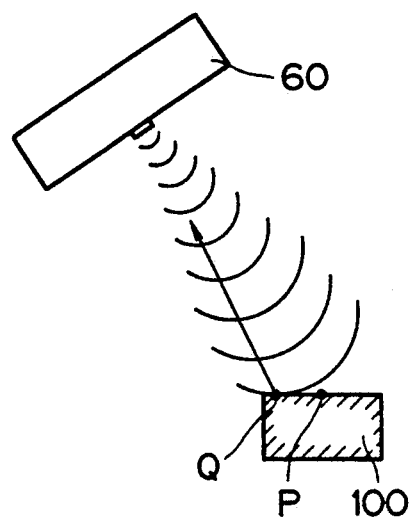
Figure 8:
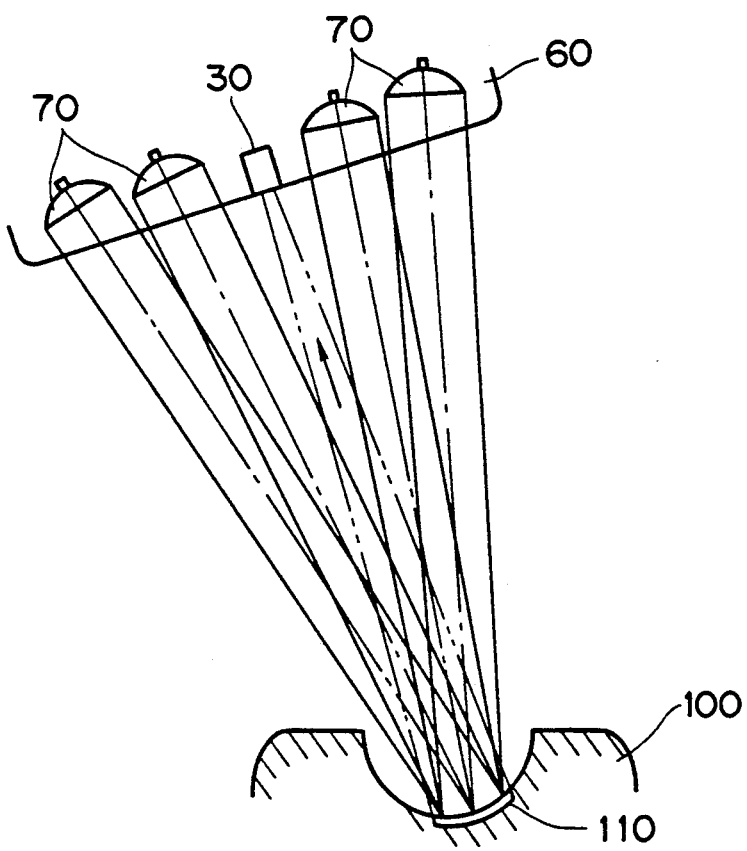
FIG. 8 is a view in which focus position is adjusted, for the depth of a human body to be operated upon, by the automatic focus position adjusting unit according to the present invention.

Lastly, the advantages of the automatic focus position adjusting unit according to the present invention will now be described in comparison with the conventional units. As shown in FIG. 6, when the housing 60 of illuminating lamps is vertically positioned over the body 100 to be operated upon, the use of waves reflected from point P permits the conventional unit using supersonic waves to accurately measure the distance. On the other hand, as illustrated in FIG. 7, when the housing 60 is positioned at an oblique angle over the body 100 to be operated upon, the use of waves reflected from point Q may cause the conventional unit to incorrectly measure the distance due to the fact that the focus lies on point P. The automatic focus position adjusting unit according to the present invention does not have such a problem. Furthermore, with the conventional unit using a transmitter, during operations, such as a laparotomy, a part 110 to be operated upon is located deep inside the body, and it is very difficult to introduce the transmitter so deep. As shown in FIG. 8, the automatic focus position adjusting unit according to the invention allows the focus position adjustment without any hindrance, even when the part 110 to be operated upon is located deep in the body 100, thereby eliminating a problem such as secondary infection.

Though the present invention has been explained with reference to one illustrated embodiment, it is not limited to this embodiment. The present invention may also be applied to various structures and configurations. In this embodiment, although the central section 20 in FIG. 1 has been described as a collection of the function blocks, these functions blocks may be constructed by using any means.

As has been described, in the automatic focus position adjusting unit in accordance with the present invention, a simple operation permits an accurate focus position adjustment at a desired position. This is because it is possible to move, the focus position to a position in which the amount of light, reflected form the predetermined region at the center of the range of light, becomes its maximum, this range being formed on an object illuminated with the illuminating bulbs.

What is claimed is:

1. An automatic focus position adjusting unit for use in a shadowless lighting device for illuminating an object, said shadowless lighting device having a housing, a plurality of illuminating bulbs arranged in said housing, and a drive system for inclining said illuminating bulbs so that the optical axes of said illuminating bulbs may converge, and form a focus, on a predetermined position along a focus moving axis, said shadowless lighting device being arranged such that said focus moves in a first direction along said focus moving axis when said drive system is moved in the first direction and said focus moves in a second direction along said focus moving axis when said drive system is moved in the second direction, said automatic focus position adjusting unit comprising:
   a sensor for outputting a value corresponding to the amount of light reflected form a predetermined region at the center of a range of the light, said range being formed on said object illuminated by said illuminating bulbs;
   a start switch for actuating a focus position adjustment;
   a start process means for retaining, when said start switch is actuated, a value which said sensor outputs, and for performing a start process in which said drive system is driven is said first direction;
   a direction adjusting means for comparing a value which said sensor outputs, after said start process means has performed the start process, with a value retained by said start process means, wherein said direction adjusting means determines that said first direction is a proper adjustment direction, when the outputted value, after said start process means has performed the start process, is higher than the value retained by said start process means, and wherein said direction adjusting means determines that said second direction is the proper adjustment direction, when the outputted value, after said start process means has performed the start process, is lower than the value retained by said start process means;
   a focus moving means for driving said drive system in the proper adjustment direction, after said direction adjusting means has made its determination;
   a peak detection means for monitoring a value which said sensor outputs while said focus moving means is driving said drive system, wherein when the value reaches a peak value, said peak detection means retains this peak value; and
   an adjustment completion means for driving said drive system in a direction opposite to the proper adjustment direction when said peak detection means detects the peak value, and when the value which said sensor outputs again reaches said peak value, said adjustment completion means stops said drive system, thereby completing a focus adjustment.

* * * * *